US005196870A

United States Patent [19]

Itoh et al.

[11] Patent Number: 5,196,870

[45] Date of Patent: Mar. 23, 1993

[54] ELECTROPHOTOGRAPHIC PRINTER

[75] Inventors: Shinichi Itoh; Takayuki Takeda, both of Tokyo, Japan

[73] Assignee: Oki Electric Industry Co., Ltd., Tokyo, Japan

[21] Appl. No.: 721,398

[22] Filed: Jun. 26, 1991

[30] Foreign Application Priority Data

Jul. 10, 1990 [JP] Japan .................................. 2-180621
Oct. 22, 1990 [JP] Japan .................................. 2-281937

[51] Int. Cl.[5] ........................ G01D 15/06; G03G 5/00; B41J 2/45

[52] U.S. Cl. ........................................ 346/155; 355/212; 400/119

[58] Field of Search ........................ 346/155; 355/212; 400/119

[56] References Cited

U.S. PATENT DOCUMENTS

| | | | |
|---|---|---|---|
| 4,392,755 | 7/1983 | Donoso | 400/119 |
| 4,639,749 | 1/1987 | Ito | 346/153.1 |
| 4,657,416 | 4/1987 | Magnenet | 400/119 |
| 4,845,519 | 7/1989 | Fuse | 346/153.1 |

FOREIGN PATENT DOCUMENTS

| | | | |
|---|---|---|---|
| 56-077167 | 6/1981 | Japan . | |
| 56-89576 | 7/1981 | Japan . | |
| 58-96574 | 6/1983 | Japan | 400/120 |
| 59-015962 | 1/1984 | Japan . | |
| 23033 | 6/1985 | Japan . | |
| 23034 | 6/1985 | Japan . | |
| 61-152463 | 7/1986 | Japan . | |

*Primary Examiner*—George H. Miller, Jr.
*Attorney, Agent, or Firm*—Spencer, Frank & Schneider

[57] ABSTRACT

An electrophotographic printer having a print head which moves in a direction perpendicular to the direction of paper feed. The print head comprises a photosensitive drum, a transfer roller disposed in opposition to the recording paper where it moves over the platen, and a toner image bearing belt passing around the photosensitive drum and passing between the transfer roller and the recording paper over the platen. An electrostatic latent image is formed on the photosensitive drum, and a toner image corresponding to the latent image is formed on the toner image bearing belt. The toner image is transferred to and fixed on the recording paper at the location where the transfer roller presses the toner image bearing belt against the recording paper. The print head is moved for spacing while the transfer and fixing are taking place. The sequence of the toner images transferred to and fixed on the recording paper form a desired print out of one line.

8 Claims, 8 Drawing Sheets

ELECTROPHOTOGRAPHIC PRINTER

FIELD OF THE INVENTION

The present invention relates to an electrophotographic printer.

BACKGROUND OF THE INVENTION

Electrophotographic printers having an LED array for the exposure light source have been employed as a printer terminal for personal computers and work stations. In the conventional electrophotographic printers, the LED array is comprised of LED chips each of which is made up of a plurality of LED elements formed on a single chip and arranged in a column, and which are disposed side by side in a line to provide the required dimension corresponding to the width of the recording paper.

Because the brightness may vary from one LED chip to another, it is necessary, in forming a line of LED chips, to select the chips having identical brightness. As a result, the yield of the chips is low. Moreover, the assembly requires much labor, resulting in a higher cost.

To improve this situation, electrophotographic serial printers employing a LED array comprising a single LED chip have been proposed (Japanese Patent Kokoku Publication No. 23033/1985, and Japanese Patent Kokoku Publication No. 23034/1985). The electrophotographic serial printers have a carriage that moves back and forth in a direction in which perpendicular to the direction of the recording paper is fed, and devices for the respective processes of the electrophotography (charging, exposure, development, transfer, fixing and cleaning) are mounted on the carriage. Magnetic toner images formed on the photosensitive member are transferred to the recording paper, utilizing a suitable magnetic source, and fixed by applying heat from a heat source to the toner on the recording paper.

Systems using electrostatic forces for the transfer to the recording paper have also been proposed (Japanese Patent Kokai Publication No. 152463/1986). Transfer of the toner to the recording paper is made for a certain number of printing lines and the recording paper with the toner image unfixed is advanced to the fixing means where the toner image is fixed.

With the electrophotographic printer utilizing the magnetic source for image transfer, the toner that is used must be a magnetic toner, which is more expensive than an ordinary toner which does not contain magnetic powder.

With the electrophotographic printer utilizing electrostatic forces, the toner after the transfer is attached to the recording paper only with a weak force, so when the carriage is returned to the original position, or when the next line is printed, the carriage is brought into contact with the unfixed toner. resulting in disturbances of the print output (printed toner images).

If an electrostatic force is utilized for the image transfer to the recording paper, and heat from the heating source is applied on the toner on the recording paper for fixing the image, toner other than magnetic toner may be used, and the toner image is not disturbed even if the toner an the preceding line and the photosensitive member are in contact with each other when the next line is printed. The heat efficiency in this non-contact fusing method however is very low, and the recording speed cannot be increased much. Moreover, the temperature in the device is increased, so that the recorded image is prevented from being stabilized. Furthermore, separate devices are required for the transfer process and the fixing process, so that the size of the entire device and its cost are increased.

A further problem associated with the prior-art electrophotographic printer is that recording is performed while the carriage is moved in one direction only and is not performed while the carriage is moved in the other direction. The recording speed is therefore limited.

SUMMARY OF THE INVENTION

The invention aims at solving the problems in the prior-art electrophotographic printer.

An object of the invention is to provide an electrophotographic printer of the serial type, which can use ordinary toner, not necessarily magnetic toner, which can be adapted, with a low cost, to color printing, and with which, during image transfer of a line, the toner image of the preceding transferred line is not disturbed.

Another object of the invention is to provide an electrophotographic serial printer in which recording is performed while the carriage is moved in either direction, whereby the recording speed is improved.

According to the invention, there is provided an electrostatic latent image carrier;

a toner image bearing belt partially in contact with said electrostatic latent image carrier;

a charging means for charging the surface of said electrostatic latent image carrier;

an exposure means for exposing the electrostatic latent image carrier having been charged, to form an electrostatic latent image;

a developing means disposed at a location where the toner image bearing belt contacts with the electrostatic latent image carrier, to form, on said toner image bearing belt, a toner image corresponding to the latent image on said electrostatic latent image carrier; and a transfer and fixing means disposed at a location where recording paper contacts with said toner image bearing belt on which the toner image has been formed, for transferring and fixing the toner image onto the recording paper.

When the electrostatic latent image carrier whose surface has been charged is exposed by the exposure means, an electrostatic latent image is formed on the surface. The developing means develops the electrostatic latent image into a toner image.

The transfer and fixing means thereafter transfers and fixes the toner image onto a recording paper. The recording paper is clamped between the toner image bearing belt and the platen, and is pressed toward the platen by means of a transfer roller.

When the carriage is moved in the direction perpendicular to the movement of the recording paper, the electrostatic latent image carrier and the toner image bearing belt are moved in synchronism therewith, and the image transfer and fixing on the recording paper are made continuously.

In a second aspect of the invention, the printing is conducted while the carriage is moving in either direction. That is, after printing with the carriage moving in one direction is completed, the paper is line-fed, and then the printing is performed with the carriage moving in the opposite direction. Upon completion of such movement of the carriage in said opposite direction, the recording paper is line-fed, and the printing with the carriage moving in the first mentioned direction is again performed. This sequence is repeated. With such arrangement, the printing speed is increased.

For the bilateral printing, two charging means are provided on respective sides of the exposure means. Depending on the direction in which the carriage is moved, either the first or the second charging means is selected to charge the electrostatic latent image carrier. Moreover, when the direction of movement of the carriage changes the corresponding direction of movement of the electrostatic latent image carrier and the toner image bearing member is altered to produce the bilateral printing.

DETAILED DESCRIPTION OF THE PREFERRED EMBODIMENTS

An embodiment of the invention will now be described with reference to the drawings.

Figure 1:
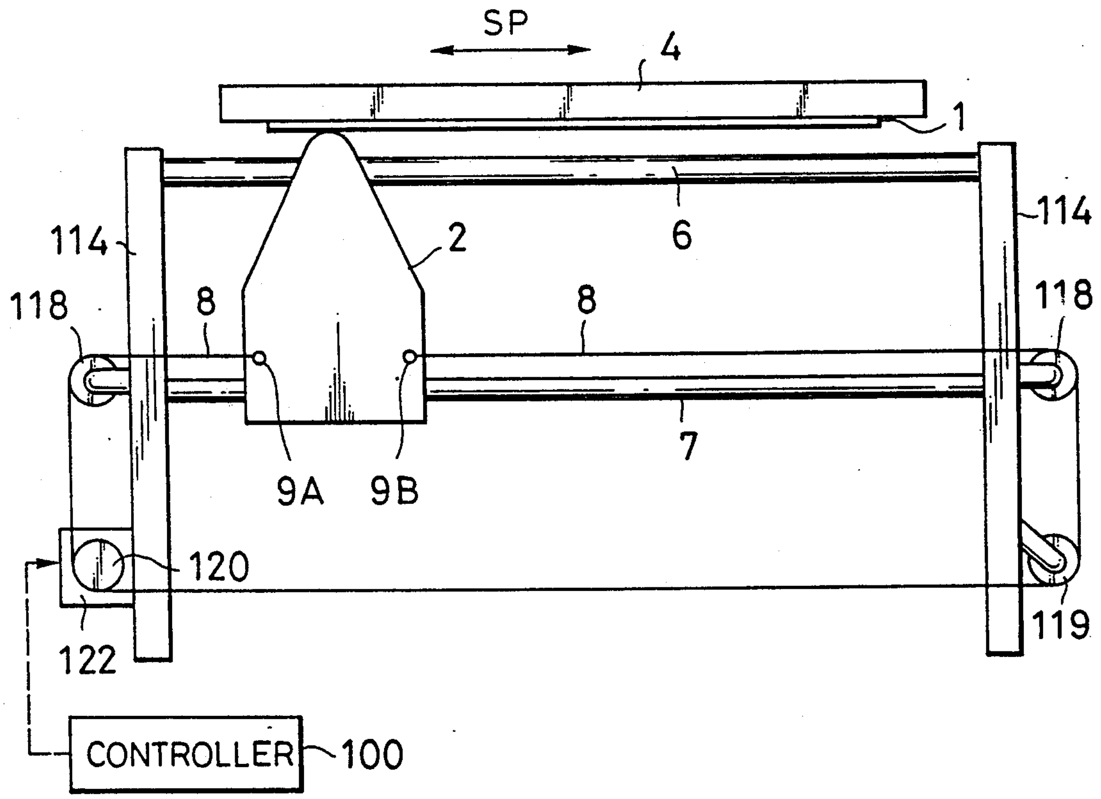
FIG. 1 is a plan view of an electrophotographic printer according to the invention.
Figure 2:
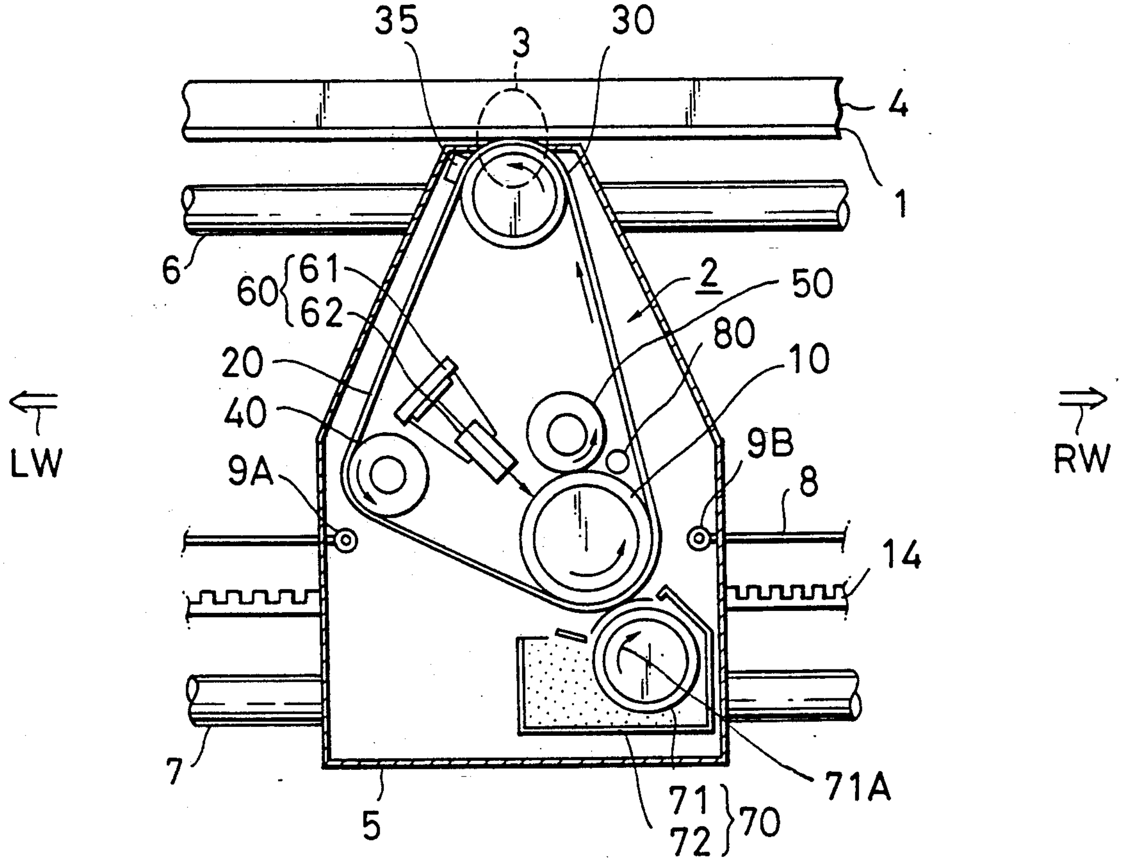
FIG. 2 is a sectional plan view, in an enlarged scale, showing details of the pertinent portion of the printer.
Figure 3:
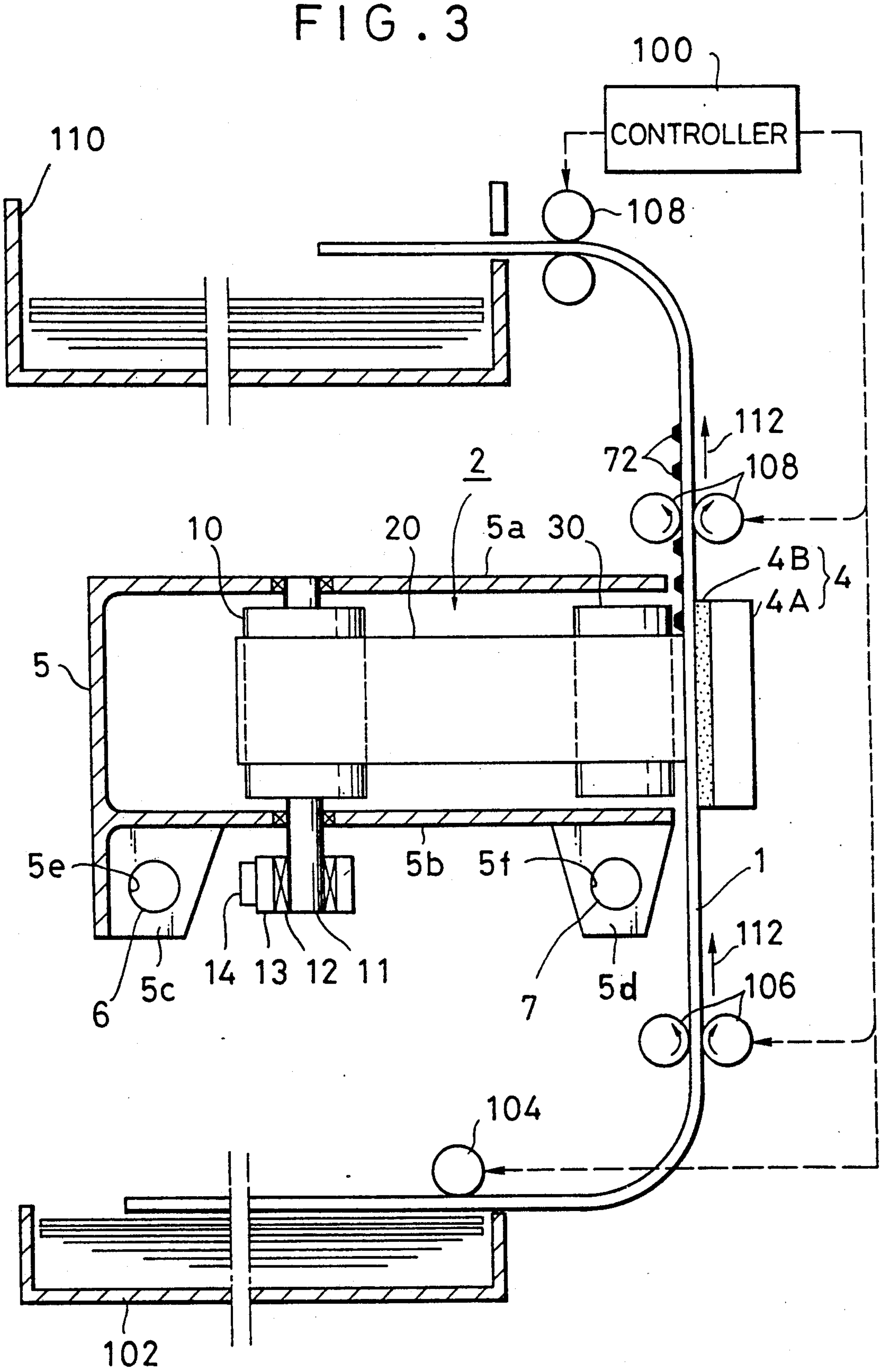
FIG. 3 is a side view of the printer.

Referring first to FIGS. 1-3, the electrophotographic printer of this embodiment comprises a flat platen 4, on which a recording paper 1 is placed. The recording paper 1 is fed in the direction of arrow 112 (FIG. 3) from a paper cassette 102, by a paper pick-up roller 104, and paper advance rollers 106. As the recording paper 1 is passed over the platen 4 it is moved along the surface of the platen 4 in a paper-feed direction (vertical as seen in FIG. 3). After the printing, the paper 1 is fed in the direction of arrow 112 (FIG. 3) and ejected by paper eject rollers 108 onto a stacker 110. The operation of the rollers 104 to 108 are controlled by a controller 100. The recording paper is fed intermittently in a manner later described.

The flat platen 4 comprises a metallic supporting plate 4A and a heat-resistant elastic layer 4B made for example of silicone rubber, and laid on the supporting layer 4A. The platen 4 extends to cover the full width of the paper 1, i.e., the dimension of the paper that is perpendicular to the paper-feed direction. The dimension of the platen 4 in the direction of the paper feed is sufficient to cover the "height" of each scan, that is, the dimension in the paper-feed direction that is printed during each scan of a carriage 5 in the spacing direction SP (FIG. 1), i.e., in the direction of the width of the paper 1. This spacing direction is along the surface of the platen 4, and is at an angle, typically at a right angle, with the paper-feed direction 112.

The carriage 5 has an upper plate **5*a*, a lower plate 5*b*, and slide blocks 5*c* and 5*d* fixed to the lower plate 5*b*. Extending respectively through cylindrical holes 5*e* and 5*f* in the slide blocks 5*c* and 5*d* are guide shafts 6 and 7. The guide shafts 6 and 7 extend in the spacing direction and have their ends fixed to a pair of side frames 114. The carriage 5** is thereby supported such that it is movable back and forth in the spacing direction.

A wire 8 is provided for moving the carriage 5 in the spacing-movement direction. One end of the wire 8 is fixed to a pin 9A on the left side of the carriage 5, and the other end of the wire 8 is fixed to a pin 9B on the right side of the carriage 5. The wire 8 is passed around free pulleys 118 and a tension pulley 119 which are mounted on the side frames 114, and wound on and pulled by a drive pulley 120 also mounted on the side frames 114. The drive pulley 120 is driven by a stepping motor 122, the rotation of which is controlled by the controller 100.

The carriage 5 accommodates an electrophotographic print head 2. The electrophotographic print head 2 comprises an electrostatic latent image carrier in the form of a photosensitive drum 10 having a shaft 11 fixed to and coaxial with the photosensitive drum 10 and extending through and rotatably supported by the upper plate **5*a* and the lower plate 5*b* of the carriage 5**.

The electrophotographic print head 2 also comprises a transfer and fixing section 3 (FIG. 2) comprising the platen 4 and a transfer roller 30 having an axis parallel with the surface of the platen 4 and at an angle, typically at a right angle, with the spacing direction. The transfer roller 30 is pressed against the platen 4, by a means not shown.

The axis of the shaft 11 is parallel with the axis of the transfer roller 30. A gear 13 is fixed, via a one-way clutch 12, to the lower end of the shaft 11, and meshes with a rack 14 which extends in the spacing direction and has ends fixed to and supported by the side frames 114.

As the carriage 5 is moved in the spacing direction SP being pulled by the wire 8, the gear 13 meshing with the rack 14 rotates. When the carriage 5 is moving in the direction rightward RW (FIG. 2), the rotation of the gear 13 is transmitted via the one-way clutch 12 to the shaft 11. When the carriage 5 is moving in the leftward direction LW the rotation of the gear 13 is not transmitted to the shaft 11 because of the function of the one-way clutch 12.

The photosensitive drum 10 comprises a photoconductive layer deposited on a conductive supporting member, and may be made up of a selenium photosensitive material, an organic photosensitive material, a zinc oxide photosensitive material, an amorphous silicon photosensitive material, or the like.

A toner image bearing belt 20, in the form of an endless belt, is passed around the photosensitive drum 10, the transfer roller 30, and a tension roller 40. More particularly, the toner image bearing belt 20 is in contact, on a first or inner surface thereof, with the peripheral surface of the photosensitive drum 10 over a portion of the photosensitive drum arc, and as the photosensitive drum 10 rotates, the toner image bearing belt 20 moves together with and at the same speed as the photosensitive drum 10 because of the friction between the toner image bearing belt 20 and the photosensitive drum 10. Where the toner image bearing belt 20 passes around the transfer roller 30, it passes between the transfer roller 30 and the platen 4 and hence through the transfer and fixing section 3. Toner images are formed on the toner image bearing belt 20, in a manner later described.

The tension roller 40 is provided with a tension mechanism, not shown, to apply an appropriate tension to the toner image bearing belt 20.

A post-fixing cleaner 35 is provided to face the toner image bearing belt 20 as it has separated from the platen 4, and is still passing around the transfer roller 30. The post-fixing cleaner 35 is pressed against the toner image bearing belt 30 to remove any residual toner after the transfer, as will be more apparent later.

As the photosensitive drum 10 rotates, its surface sequentially passes various processing sections or devices, namely a charging device 50, an exposure device 60, a developing device 70, and a discharge lamp 80.

Between the location where the exposure device 60 confronts the photosensitive drum 10 and the location where the developing device 70 confronts the photosensitive drum 10, the toner image bearing belt 20 is brought into contact with the photosensitive drum 10. Between the location where the developing device 70 confronts the photosensitive drum 10 and the location where the discharging lamp 80 confronts the photosensitive drum 10, the toner image bearing belt 20 is separated from the photosensitive drum 10.

The charging device 50 is provided in opposition to the surface of the photosensitive drum 10 to uniformly charge the surface of the photosensitive drum 10. The charging device 50 may be made up of a conductive roller comprising a conductive rubber laid on a metallic conductive shaft. A brush charger, or a corona charger may be used instead.

The exposure device 60 exposes the surface of the photosensitive drum 10 to a light image or radiation pattern into which the electrical signal representing the image has been converted. The light image is emitted from an LED array 61 consisting of a number of LED elements arranged in a column extending in parallel with the axis of the photosensitive drum 10. The number of LED elements in the array is 256, for example, when the density is about 240 DPI (dots per inch). The arrangement of the LED elements is similar to the arrangement of tips of wires in a wire dot print head. As a means for image-formation, a rod lens (sold under the trademark Selfoc) 62 is inserted between the LED array 61 and the surface of the photosensitive drum 10.

A linear electrostatic latent image is formed on the photosensitive surface of the drum 10 by irradiating the drum surface with light from the column of LED elements. As the photosensitive drum 10 rotates the light image irradiated from the LED array is altered so that the electrostatic latent images are formed in sequence in the circumferential direction of the photosensitive drum 10.

The areas or dots of the photosensitive surface which have been irradiated by light are discharged, while the areas or dots of the photosensitive drum which have not been irradiated are kept charged.

The developing device 70 is positioned to face the toner image bearing belt 20 as it passes over the photosensitive drum 10. In other words, it is positioned to face the photosensitive drum 10 through the toner image bearing belt 20. The developing device 70 is provided with a toner carrier 71 which rotates attracting toner 72 on to its surface, and transports it in the direction of arrow 71A shown in FIG. 2. By developing the electrostatic latent image, the developing device 70 develops, on the toner image bearing belt 20, a toner image corresponding to the electrostatic latent image on the photosensitive drum 10.

The toner carrier 71 may be driven by mechanically transmitting the rotation of the shaft 11 of the photosensitive drum 10 to the toner carrier 71, by means not shown.

The developing device 70 may alternatively be any of a two-component magnetic brush developer, a one-component magnetic brush developer, a one-component nonmagnetic developer, and the like.

In the present embodiment, a reversal development is employed, and a bias voltage is applied across the conductive supporting member of the photosensitive drum 10 and the toner carrier 71. With such a construction, due to the electrostatic latent image on the photosensitive drum 10, electric lines of force are created in the space between the toner carrier 71 and the toner image bearing belt 20, and penetrate the toner image bearing belt 20. As a result, the charged toner 72 on the toner carrier 71 is attracted to the parts of the toner image bearing belt 20 corresponding to the parts of the photosensitive drum 10 where the electric charges are lost, to form a toner image.

The discharge lamp 80 is also provided so as to face the part of the photosensitive drum 10 which has just separated from the toner image bearing belt 20 after developing. The function of the discharge lamp 80 is to irradiate the photosensitive drum through its entire width to dissipate any residual charges on it thereby making it ready for the next cycle of operation.

Figure 4:
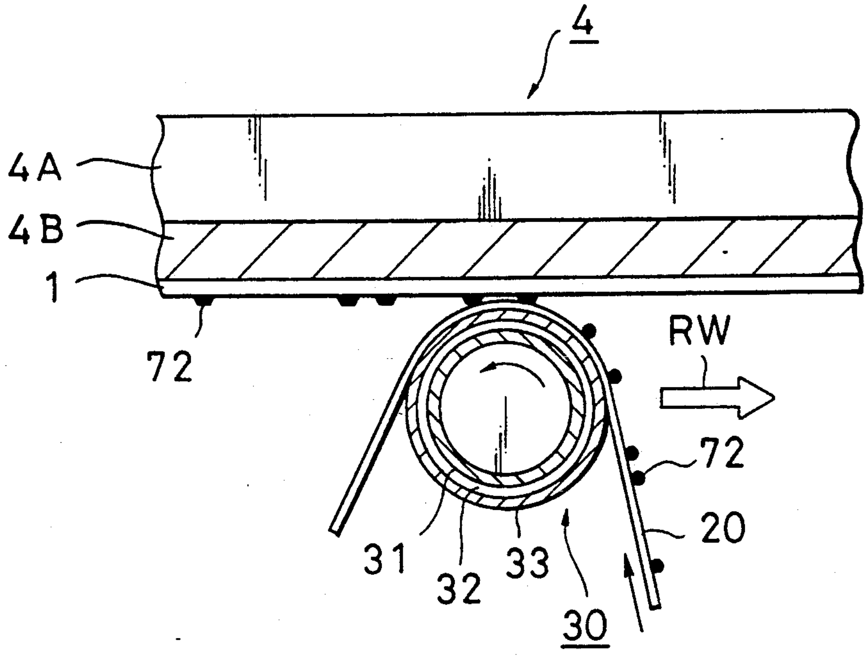
FIG. 4 is an enlarged view of the transfer section of the electrophotographic printer according to the invention.

As is shown in greater detail in FIG. 4, the transfer roller 30 comprises a support member 31 in the form of a hollow sleeve made of a glass material, a ceramic material or a metallic material having its surface enameled, and a resistive layer 32 and an insulating layer 33 layered in trrn on the enameled surface. The resistive layer 32 is fed with an electric current from a current supply means, not shown, to generate heat. The transfer roller 30 is provided with a means for applying a pressure toward the platen 4 and a means for removing the pressure, also not shown.

The toner image bearing belt 20 must have an insulating property for the development, and a heat-resistant property for the transfer and fixing. Materials suitable for the toner image bearing belt are polyester, polyimide, polyetherimide, polyethersulfone, polyetheretherketone and the like.

In the printing condition, the transfer roller 30 is pressed by the pressing means, not shown, against the platen 4, clamping the toner image bearing belt 20. A recording paper 1 is fed by the pick-up roller 104 and the advance rollers 106 between the toner image bearing belt 20 and the platen 4, and is thereby clamped with the toner image bearing belt 20 between the transfer roller 30 and the platen 4.

Before the scanning or spacing-movement for printing is actually started, the carriage 5 is returned to the home position on the left (FIG. 1). To start the spacing-movement for printing, the carriage 5 is pulled by the wire 8 and moved, at a constant speed, to the right as indicated by arrow RW. Accompanying the rightward movement of the carriage 5, the gear 13 meshing with the rack 14, rotates drum 10 in the direction illustrated in FIG. 2 by virtue of the one-way clutch 12 which transmits the rotation in this direction. The toner image bearing belt 20 in contact with the photosensitive drum 10 moves at substantially the same speed in the direction of the arrow by virtue of the frictional force with the photosensitive drum 10. The rotational speed of the photosensitive drum 10 is set so that the peripheral speed of the photosensitive drum 10, and hence the speed of the toner image bearing belt 20 will be substantially equal to the speed of the spacing movement of the carriage 5.

As the photosensitive drum 10 rotates, it passes by the charging device 50, the exposure device 60, the development device 70 and the discharge lamp 80, and is therefore subjected to the respective processes of electrophotography.

At the charging device 50, the surface of the photosensitive drum 10 is charged uniformly. At the exposure device 60, the electrostatic latent image is formed. This electrostatic latent image corresponds to the image signals supplied to the exposure device 60 from the controller 100 in synchronism with the movement of the carriage 5. The LED array 61 in the exposure device 60 produces one linear image consisting of an array of dots arranged in the direction of width (dimension parallel to the axis) of the photosensitive drum 10. As the photosensitive drum 10 rotates, the sequence of the linear images are formed, with the image signals supplied to the exposure device 60 being altered in synchronism with the rotation of the photosensitive drum 10.

At the development device 70, a toner image corresponding to the electrostatic latent image is formed on the toner image bearing belt 20.

More specifically, toner 72 is attracted to the toner carrier 71, and transported by it in the direction shown by arrow 71A in FIG. 2. When the toner 71 comes to a position where it contacts the toner image bearing belt 20, toner is attracted to the toner image bearing belt 20, thereby forming a toner image corresponding to the electrostatic latent image.

The toner image bearing belt 20 that has passed out of the development section, is then separated from the photosensitive drum 10, and then travels to the transfer and fixing section 3, between the transfer roller 30 and the recording paper 1 on the platen 4.

In the transfer and fixing section, the toner image bearing belt 20 on which the toner image has been formed, and the recording paper 1 are heated and by the transfer roller 30 pressed against the platen 4. During the transfer and the fixing, heat from the transfer roller 30 is transmitted to the toner image bearing belt 20, and the toner 72 on the toner image bearing belt 20 melts and is pressed, to permeate between the fibers of the recording paper 1 so that the transfer to and fixing on the recording paper 1 are simultaneously conducted.

The position at which the toner image bearing belt 20 over the transfer roller 30 is in contact with the recording paper 1 moves rightward i.e. in the direction of arrow RW, because of the spacing operation of the carriage 5. That is, each time the carriage 5 moves by a distance between adjacent columns of dots, i.e., the pitch of the dots in the spacing direction, a linear visible image of the new dot pattern is successively transferred onto the recording paper 1.

As the position at which the toner image bearing belt 20 contacts with the recording paper 1 moves, the toner image bearing belt 20 rolls on the recording paper 1 such that there is no relative speed or displacement between the toner image bearing belt 20 and the recording paper 1. Smooth movement of the print head 2 is therefore ensured. This is an advantage derived from the peripheral speed of the photosensitive drum 10 being set to be identical to the speed of the movement of the carriage 5.

Some toner 72 may remain on the toner image bearing belt 20 after the transfer and fixing, but is removed by the post-fixing cleaner 35 pressed on the toner image bearing belt 20 over the transfer roller 30. The toner is easily removed since at this time it is still molten.

The photosensitive drum 10 having been separated from the toner image bearing belt 20 after the development process, is irradiated, throughout its entire surface, with the discharge lamp 80 so that any residual electric charges are removed from the surface. The photosensitive drum 10 can thus be used repeatedly.

When recording of one line (line extending in the spacing direction) is completed, and the carriage 5 reaches the right control position, the wire 8 to the left of the carriage 5 pulls the carriage leftward as indicated by arrow LW at a speed higher than in the recording to return the carriage 5 to the original home position. During this return movement, the pressure of the transfer roller 30 onto the platen 4 is then removed, and the toner image bearing belt 20 is not in contact with the recording paper 1. Concurrently, the recording paper 1 is line-fed to the line to be recorded next. At the time of this return operation, a drive force is transmitted to the gear 13 meshing with the rack 14, and the gear 13 rotates in the direction reverse to the direction of rotation during recording. Because of the one-way clutch 12, however, the reverse drive force is not transmitted, so the photosensitive drum 10 does not rotate.

The above-described recording operation, the return operation, and the line-feed operation are sequentially and repeatedly performed, and dot patterns are printed for successive lines. During the recording of the next line, the transfer roller 30 and the toner image bearing belt 20 contact the recorded toner 72, but as it is already fixed, the toner image is not disturbed.

Figure 5:
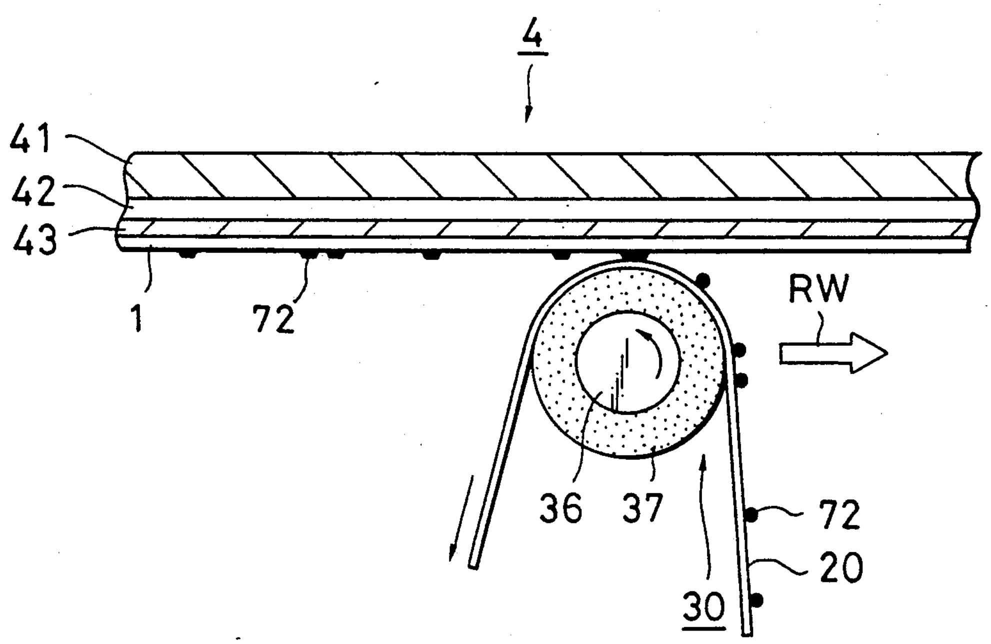
FIG. 5 is an enlarged view of a modification of the transfer and fixing section.

FIG. 5 is an enlarged view of a modification of the transfer section.

In this case, the heating means is provided in the platen 4. The platen 4 is comprised of a supporting plate 41 made of glass, ceramics, or metal that has been enameled, and a resistive layer 42 and an insulating layer 43 layered in turn on the supporting plate 41. The transfer roller 30 is comprised of a metallic supporting member 36, and an elastic layer 37, e.g., a silicone rubber, layered on the supporting member 36.

The belt forming the toner image bearing belt 20 need not be an endless belt as in the first embodiment, but may be an ended sheet having one end on a supply roller and having the other end on a winding roller.

The photosensitive drum 10 need not be irradiated directly with light, but may be irradiated through the toner image bearing belt 20. In that case, the belt 20 must be transparent to the wave length of the light from the exposure device.

Figure 6:
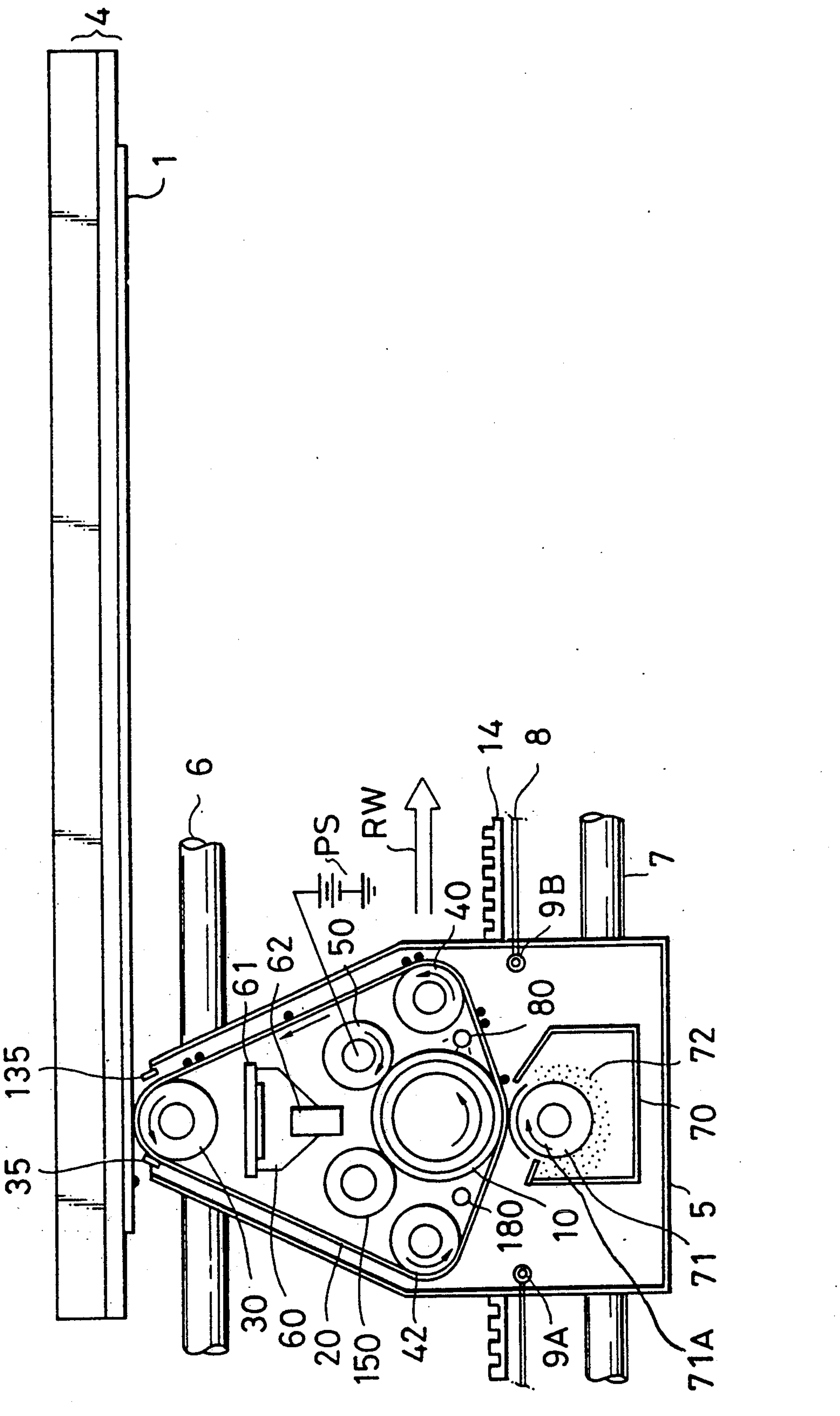
FIG. 6 is a view showing the state in which the carriage is moved rightward in an electrophotographic printer of a second embodiment of the invention.
Figure 7:
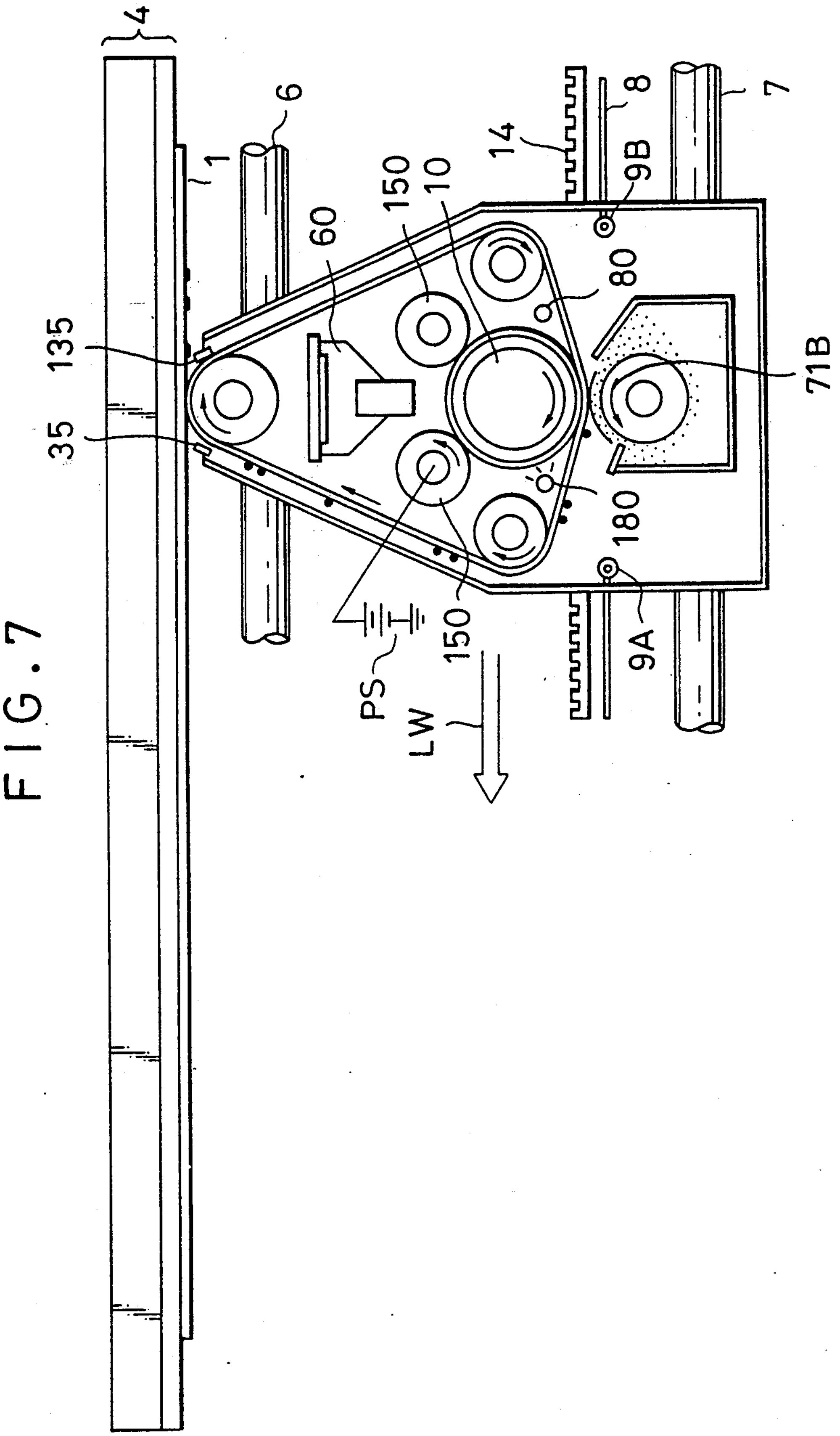
FIG. 7 is a view showing the state in which the carriage is moved leftward in the electrophotographic printer of the second embodiment of the invention.
Figure 8:
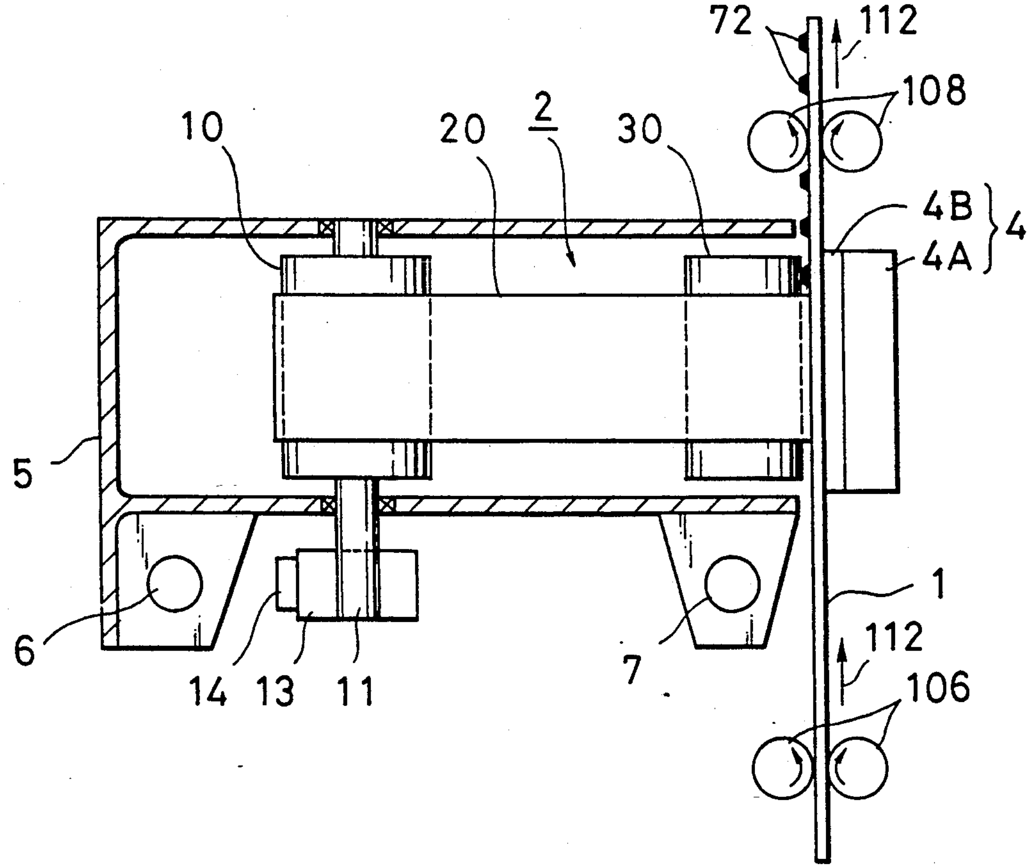
FIG. 8 is a side view of the electrophotographic printer of the second embodiment of the invention.

FIG. 6 to FIG. 8 shows a second embodiment of the invention. This embodiment differs from the first embodiment in that the printing is made while the carriage is moving leftward LW as well it is moving rightward RW. For this purpose, the carriage is moved at the same speed when it is moving leftward as it is moving rightward. For this to be achieved, the one-way clutch 12 in FIG. 3 is eliminated, and the gear 13 is fixed directly to the shaft 11 (FIG. 8).

When the carriage 5 is moving leftward, the photosensitive drum 10 rotates in the opposite direction (clockwise as seen in FIG. 7). The direction of rotation of the toner carrier 71 may also be reversed but it may be kept unchanged.

In addition to the charging device 60, another charging device 150 is provided, with the two charging devices 50 and 150 being disposed on both sides of the exposure device 50. The charging device 50 is made to operate when the carriage 5 is moving rightward. The charging device 150 is made to operate when the carriage 5 is moving leftward.

Such selective operation may be achieved by selective application of the voltage to the charging devices 50 and 150, or by selective movement toward and away from the surface of the photosensitive drum 10.

In addition to the discharge lamp 80, another discharge lamp 180 is provided. The discharge lamp 80 is made to operate when the carriage 5 is moving rightward. The discharge lamp 180 is made to operate when the carriage 5 is moving leftward.

In addition to the post-fixing cleaner 35, another post-fixing cleaner 135 is provided. The post-fixing cleaner 35 is made to operate when the carriage is moving rightward, and the post-fixing cleaner 135 is made to operate when the carriage 5 is moving leftward.

The toner image bearing belt 20 is passed around a free roller 42, in addition to the tension roller 40, the transfer roller 30 and the photosensitive drum 10.

While the carriage 5 is moving rightward RW, the charging device 150, the discharge lamp 180 and the post-fixing cleaner 135 are made inactive, and the charging device 50, the discharge lamp 80 and the post-fixing cleaner 35 are made to operate, under control of the controller 100, and an operation similar to that described in connection with the first embodiment is conducted to perform printing of one line.

When the carriage 5 reaches the right control position, and the printing of one line with the rightward movement of the carriage 5 is thus completed, the recording paper 1 is line-fed to the next line. The carriage 5 is pulled by the wire 8 leftward and the printing of the next line is conducted while the carriage 5 is moving leftward LW. When the carriage is moving leftward, the charging device 50, the discharging lamp 80, and the post-fixing cleaner 35 are made inactive, and the charging device 150, the discharging lamp 180, and the post-fixing cleaner 135 are made to operate. The carriage 5 is moved at the same speed as in the rightward movement. The photosensitive drum 10 and the toner image bearing belt 20 are moved in the reverse direction. The image signals are supplied from the controller 100 to the exposure device 150 in the reverse sequence since the printing is made in the reverse direction.

When the carriage 5 reaches the home position, and the printing of the one line with the leftward movement of the carriage 5 is thus completed, the recording paper 1 is line-fed to the next line, and the printing with the rightward movement of the carriage 5 is commenced. Subsequently, the above described operation is repeated.

In this way, the recording in the rightward and the leftward directions are alternately conducted, for printing dot patterns in a plurality of lines.

Modifications similar to those described with reference to the first embodiment can also be made to the second embodiment.

In the first and the second embodiments, the post-fixing cleaners 35 and 135, and the discharge lamps 80 and 180 may be omitted where the toner or the charge does not remain in such an amount as to cause a problem.

The present invention is not limited to the embodiments described above, but various modifications are possible without departing from the scope of the invention.

As has been described, according to the invention, a one-chip LED array can be used as the light source in the LED array. Moreover, any type of toner of the heat-melting type other than the magnetic toner may be used. Furthermore, at the time of transfer of the toner image, the toner image previously recorded is not disturbed even if there is a friction. The cost of the apparatus can be decreased. In addition, the recording speed can be increased by printing while the carriage is moving in either direction. p

What is claimed is:

1. An electrophotographic printer comprising:
(a) a flat platen having a surface;
(b) paper feed means for feeding recording paper over the surface of said platen in a first direction;
(c) a movable print head having a portion thereof confronting the recording paper where it is fed over said platen, said print head comprising:
(c1) an electrostatic latent image carrier having a surface for receiving a charge;
(c2) a transfer roller disposed in opposition to the recording paper where it is fed over the surface of said platen;
(c3) a toner image bearing belt passing around said electrostatic latent image carrier and between said transfer roller and said recording paper;
(c4) first charging means for charging the surface of said electrostatic latent image carrier;
(c5) exposure means for exposing the charged electrostatic latent image carrier to form an electrostatic latent image;
(c6) developing means disposed in opposition to the toner image bearing belt where it passes around said electrostatic latent image carrier to form, on said toner image bearing belt, a toner image corresponding to the latent image on said electrostatic latent image carrier, said transfer roller pressing the toner image bearing belt on which the toner image is formed against the recording paper over the platen to transfer the toner image onto the recording paper;
(c7) drive means for moving the electrostatic latent image carrier and said toner image bearing belt in timed sequence with the movement of said print head; and
(c8) heating means provided in one of said platen and said transfer roller to fix the toner image on said recording paper; and
(d) a space-driving means for moving said print head along the surface of said platen in a second direction at an angle with said first direction, whereby transfer and fixing take place between said transfer roller and said platen.

2. The printer of claim 1, wherein as the movement of said print head in said second direction is completed, said paper feed means feeds the recording paper in said first direction after printing of one line of the toner image is completed.

3. The printer of claim 1, wherein further comprising means for driving the electrostatic latent image carrier and the toner image bearing belt in synchronism with the movement of the print head.

4. The printer of claim 1, wherein said electrostatic latent image carrier is a photosensitive drum.

* * * * *

5. The printer of claim 4, wherein said exposure device comprises an LED array comprised of a plurality of LED elements arranged in a column parallel with the axis of the photosensitive drum.

6. The printer of claim 1, wherein the axis of said transfer roller is parallel with the surface of said platen and at an angle with said second direction.

7. The printer of claim 1, wherein said toner image bearing belt moves at the same speed as said print head in such a direction that, during movement, there is no relative displacement between the recording paper and the toner image bearing belt.

8. The printer of claim 1, wherein said space-driving means moves said print head in either said second direction or in a direction opposite thereto, printing being conducted while said print head is moving in either of said directions;

said print head further comprises a second charging means for charging the surface of said electrostatic latent image carrier, said first and second charging means being located on opposite sides of said exposure means;

said drive means selectively moves the electrostatic latent image carrier and the toner image bearing belt in a direction corresponding to the direction of movement of said print head; and said paper feed means line-feeds the recording paper when printing in the second direction is completed, and also when printing in the direction opposite thereto is completed.

* * * * *